United States Patent
Sugimoto et al.

(10) Patent No.: US 12,155,033 B2
(45) Date of Patent: Nov. 26, 2024

(54) BATTERY

(71) Applicant: Panasonic Intellectual Property Management Co., Ltd., Osaka (JP)

(72) Inventors: Yuta Sugimoto, Hyogo (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 652 days.

(21) Appl. No.: 17/154,022

(22) Filed: Jan. 21, 2021

(65) Prior Publication Data

US 2021/0143474 A1 May 13, 2021

Related U.S. Application Data

(63) Continuation of application No. PCT/JP2019/047355, filed on Dec. 4, 2019.

(30) Foreign Application Priority Data

Dec. 27, 2018 (JP) .............................. JP2018-244145

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/134* (2013.01); *H01M 10/052* (2013.01);
(Continued)

(58) Field of Classification Search
CPC ............. H01M 10/0562; H01M 4/134; H01M 10/052; H01M 10/058; H01M 2004/027; H01M 2004/028; H01M 2300/0065
See application file for complete search history.

(56) References Cited

U.S. PATENT DOCUMENTS 7,931,989 B2    4/2011  Klaassen
2007/0015060 A1*  1/2007  Klaassen ............. H01M 10/056
                                                          429/126
(Continued)

FOREIGN PATENT DOCUMENTS

EP    3404740 A1   11/2018
EP    3512021 A1   7/2019
(Continued)

OTHER PUBLICATIONS

Bohnsack et al.; "Ternare Halogenide vom Typ A3MX6. VII. Die Bromide Li3MBr6 (M=Sm-Lu, Y): Synthese, Kristallstruktur, Ionenbeweglichkeit", Zeitschrift Fur Anorganische Allgemeine Chemie, vol. 623, Sep. 1, 1997, pp. 1352-1356 (translation) (Year: 1997).*
(Continued)

*Primary Examiner* — Brian R Ohara
*Assistant Examiner* — Michelle T Leonard
(74) *Attorney, Agent, or Firm* — Rimon P.C.

(57) ABSTRACT

A battery includes a positive electrode current collector, a positive electrode, a first electrolyte layer, a second electrolyte layer, a negative electrode, and a negative electrode current collector in this order. The first electrolyte layer contains a first solid electrolyte material, and the second electrolyte layer contains a second solid electrolyte material, the second solid electrolyte material being different from the first solid electrolyte material. An oxidation potential of the first solid electrolyte material is more noble than an oxidation potential of the second solid electrolyte material. The first electrolyte layer covers the positive electrode and is in contact with the positive electrode current collector, and/or the first electrolyte layer covers the second electrolyte layer and is in contact with the negative electrode current collector.

14 Claims, 3 Drawing Sheets

(51) Int. Cl.
H01M 4/134 (2010.01)
H01M 10/052 (2010.01)
H01M 10/058 (2010.01)

(52) U.S. Cl.
CPC .... *H01M 10/058* (2013.01); *H01M 2004/027* (2013.01); *H01M 2004/028* (2013.01); *H01M 2300/0065* (2013.01)

(56) References Cited

U.S. PATENT DOCUMENTS

| | | | |
|---|---|---|---|
| 2016/0204467 A1 | 7/2016 | Nogami et al. | |
| 2017/0162902 A1* | 6/2017 | Ohta | H01M 10/0562 |
| 2017/0309964 A1* | 10/2017 | Iwamoto | H01M 10/0565 |
| 2018/0090783 A1 | 3/2018 | Jeong et al. | |
| 2018/0337422 A1 | 11/2018 | Iwamoto | |
| 2019/0088995 A1 | 3/2019 | Asano et al. | |

FOREIGN PATENT DOCUMENTS

| | | |
|---|---|---|
| JP | 8-222235 | 8/1996 |
| JP | 08222235 A * | 8/1996 |
| JP | 2017-199668 | 11/2017 |
| JP | 2018-195573 | 12/2018 |
| WO | 2015/030052 | 3/2015 |
| WO | 2018/025582 | 2/2018 |

OTHER PUBLICATIONS

The Indian Office Action dated Jan. 10, 2023 for the related Indian Patent Application No. 202147003568.
International Search Report of PCT application No. PCT/JP2019/047355 dated Feb. 18, 2020.
The Extended European Search Report dated Jan. 21, 2022 for the related European Patent Application No. 19902907.5.
International Search Report of PCT application No. PCT/JP2019/047354 dated Feb. 18, 2020.
The Extended European Search Report dated Jan. 10, 2022 for the related European Patent Application No. 19904184.9.
The Indian Office Action dated Jan. 16, 2023 for the related Indian Patent Application No. 202147003367.
Non-Final Office Action dated Aug. 14, 2023 issued in U.S. Appl. No. 17/151,722.
Final Office Action dated Nov. 15, 2023 issued in U.S. Appl. No. 17/151,722.

* cited by examiner

BATTERY

BACKGROUND

1. Technical Field

The present disclosure relates to batteries.

2. Description of the Related Art

International Publication No. 2015/030052 discloses a battery including a first solid electrolyte layer on the positive electrode side and a second solid electrolyte layer on the negative electrode side. The first solid electrolyte layer includes a sulfide solid electrolyte. The second solid electrolyte layer includes a complex hydride solid electrolyte.

SUMMARY

In one general aspect, the techniques disclosed here feature a battery including a positive electrode current collector, a positive electrode, a first electrolyte layer, a second electrolyte layer, a negative electrode, and a negative electrode current collector. The positive electrode current collector, the positive electrode, the first electrolyte layer, the second electrolyte layer, the negative electrode, and the negative electrode current collector are disposed in this order. The first electrolyte layer contains a first solid electrolyte material, and the second electrolyte layer contains a second solid electrolyte material, the second solid electrolyte material being different from the first solid electrolyte material. An oxidation potential of the first solid electrolyte material is more noble than an oxidation potential of the second solid electrolyte material. The first electrolyte layer covers the positive electrode and is in contact with the positive electrode current collector, and/or the first electrolyte layer covers the second electrolyte layer and is in contact with the negative electrode current collector.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
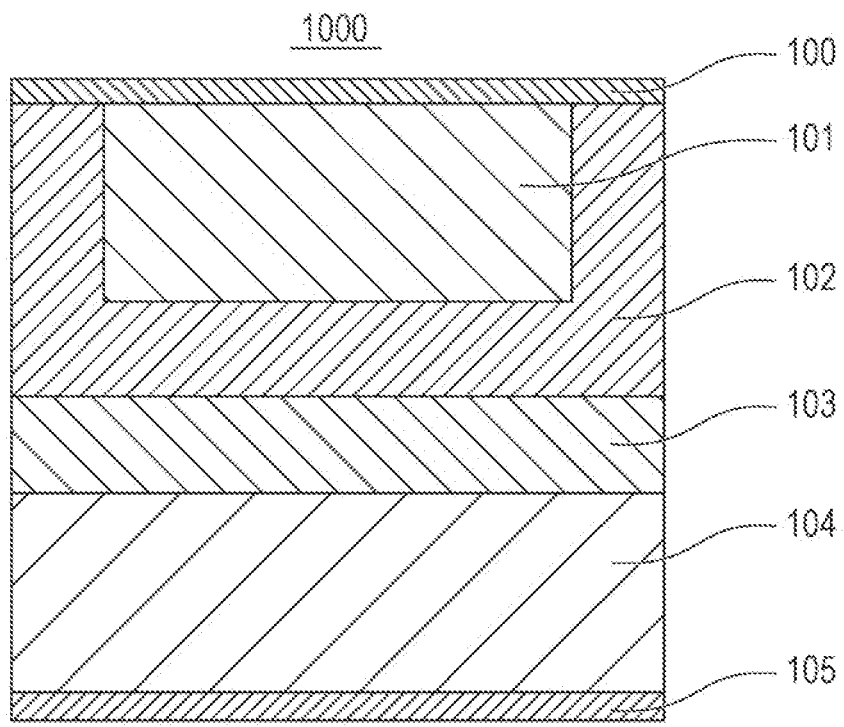
FIG. 1 is a cross-sectional view illustrating a general configuration of a battery according to a first embodiment.

International Publication No. 2015/030052 discloses that with the double solid electrolyte layer configuration, the negative-electrode-side solid electrolyte layer is inhibited from coming into contact with the positive electrode, the positive-electrode-side solid electrolyte layer is inhibited from coming into contact with the negative electrode, and, consequently, the stability of the battery is improved. On the other hand, further improvement in the stability of batteries is desired.

The present disclosure enables further improvement in the stability of batteries.

The present disclosure includes batteries itemized as follows.

Item 1

According to Item 1 of the present disclosure, a battery includes a positive electrode current collector, a positive electrode, a first electrolyte layer, a second electrolyte layer, a negative electrode, and a negative electrode current collector. The positive electrode current collector, the positive electrode, the first electrolyte layer, the second electrolyte layer, the negative electrode, and the negative electrode current collector are disposed in this order. The first electrolyte layer contains a first solid electrolyte material, and the second electrolyte layer contains a second solid electrolyte material, the second solid electrolyte material being different from the first solid electrolyte material. An oxidation potential of the first solid electrolyte material is more noble than an oxidation potential of the second solid electrolyte material. The first electrolyte layer covers the positive electrode and is in contact with the positive electrode current collector, and/or the first electrolyte layer covers the second electrolyte layer and is in contact with the negative electrode current collector.

Item 2

In the battery according to Item 1, the first electrolyte layer may be in contact with the positive electrode.

Item 3

In the battery according to Item 1 or 2, the second electrolyte layer may be in contact with the negative electrode and cover the negative electrode.

Item 4

In the battery according to any one of Items 1 to 3, the first electrolyte layer may be in contact with the second electrolyte layer and cover the second electrolyte layer.

Item 5

In the battery according to any one of Items 1 to 3, the second electrolyte layer may be in contact with the first electrolyte layer and cover the first electrolyte layer.

Item 6

In the battery according to any one of Items 1 to 5, the first solid electrolyte material may contain Li, M, and X, where M is at least one selected from the group consisting of metalloid elements and metal elements other than Li, and X is at least one selected from the group consisting of F, Cl, Br, and I.

Item 7

In the battery according to Item 6, the first solid electrolyte material may be represented by a composition formula of $Li_\alpha M_\beta X_\gamma$, where $\alpha$, $\beta$, and $\gamma$ are each a value greater than zero.

Item 8

In the battery according to Item 6 or 7, M may include yttrium.

Item 9

In the battery according to any one of Items 1 to 8, the second solid electrolyte material may be a sulfide solid electrolyte.

Embodiments of the present disclosure will now be described with reference to the drawings.

First Embodiment

FIG. 1 is a cross-sectional view illustrating a general configuration of a battery 1000, according to a first embodiment. The battery 1000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to cover the positive electrode 101 and is in contact with the positive electrode current collector 100. Furthermore, the first electrolyte layer 102 is in contact with the positive electrode 101 and covers the positive electrode 101. In this manner, the first electrolyte layer 102, which is electrochemically stable, is disposed between the second electrolyte layer 103 and the positive electrode 101, and as a result, the positive electrode 101 or the positive electrode current collector 100 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

The first electrolyte layer 102 includes the first solid electrolyte material, and the second electrolyte layer 103 includes the second solid electrolyte material, which is different from the first solid electrolyte material. It should be noted that it is sufficient that the first electrolyte layer 102 include the first solid electrolyte material as a major component, and the second electrolyte layer 103 include the second solid electrolyte material, which is different from the first solid electrolyte material, as a major component. A mass percentage of the first solid electrolyte material, which is the major component, in the entirety of the first electrolyte layer 102 may be, for example, greater than or equal to 50 mass %, or, greater than or equal to 70 mass %. A mass percentage of the second solid electrolyte material, which is the major component, in the entirety of the second electrolyte layer 103 may be, for example, greater than or equal to 50 mass %, or, greater than or equal to 70 mass %.

The first electrolyte layer 102 includes the first solid electrolyte material. It is sufficient that the first solid electrolyte material be at least one selected from a first group consisting of a plurality of solid electrolyte materials. The first electrolyte layer 102 may be a single-layer structure or a multi-layer structure. For example, the first electrolyte layer 102 may be formed of a plurality of layers, and the layers may have different respective compositions.

The second electrolyte layer 103 includes the second solid electrolyte material. It is sufficient that the second solid electrolyte material be at least one selected from a second group consisting of a plurality of solid electrolyte materials. The second electrolyte layer 103 may be a single-layer structure or a multi-layer structure. For example, the second electrolyte layer 103 may be formed of a plurality of layers, and the layers may have different respective compositions. The second solid electrolyte material is a material different from the first solid electrolyte material.

The second solid electrolyte material is a material different from the first solid electrolyte material. In this instance, the first solid electrolyte materials belonging to the first group are not the same as the second solid electrolyte materials belonging to the second group. However, the first electrolyte layer 102 may partially include a solid electrolyte material that is the same as one in the second electrolyte layer 103. A solid electrolyte material that is included in the first electrolyte layer 102 and also included in the second electrolyte layer 103 may be present in an amount of, for example, less than or equal to 50%, less than or equal to 30%, or less than or equal to 10%, relative to an amount of the first electrolyte layer 102, in terms of a volume fraction. Likewise, the second electrolyte layer 103 may partially include a solid electrolyte material that is the same as one in the first electrolyte layer 102. A solid electrolyte material that is included in the second electrolyte layer 103 and also included in the first electrolyte layer 102 may be present in an amount of, for example, less than or equal to 50%, less than or equal to 30%, or less than or equal to 10%, relative to an amount of the second electrolyte layer 103, in terms of a volume fraction.

For each of the electrolyte layers, methods for calculating the volume fraction of the solid electrolyte material are not limited. For example, a cross section of each of the electrolyte layers is processed by using a cross section polisher (CP). Next, elemental mapping is conducted by energy dispersive X-ray spectroscopy (SEM-EDX), and, from the ratio between the areas occupied by the respective materials, the volume ratio can be determined.

The first solid electrolyte material includes Li, M, and X, for example. M is at least one selected from the group consisting of metalloid elements and metal elements other than Li, and X is at least one selected from the group consisting of F, Cl, Br, and I. The first solid electrolyte material is represented by, for example, composition formula (1): $Li_\alpha M_\beta X_\gamma$, where $\alpha$, $\beta$, and $\gamma$ are each a value greater than zero. M may include yttrium, Solid Electrolyte Material In the present disclosure, the "metalloid elements", as referred to below, are B, Si, Ge, As, Sb, and Te. Furthermore, the "metal elements" are all the elements (excluding hydrogen) from Group 1 to Group 12 of the periodic table and all the elements (excluding B, Si, Ge, As, Sb, Te, C, N, P, O, S and Se) from Group 13 to Group 16 of the periodic table. That is, the "metalloid elements" and the "metal elements" are elements that can become a cation in instances in which the element forms an inorganic compound with a halogen element.

The first solid electrolyte material may be a material that contains Li, M1, and X1. The element M1 is at least one selected from the group consisting of metalloid elements and metal elements other than Li. Furthermore, the element X1 is at least one selected from the group consisting of F, Cl, Br, and I. With any of these configurations, the stability of the battery is further improved. In addition, ionic conductivity of the first solid electrolyte material is further improved. As a result, charge-discharge efficiency of the battery is improved.

For example, the first solid electrolyte material may be a material represented by composition formula (1a): $Li_{\alpha 1}M1_{\beta 1}X1_{\gamma 1}$, where $\alpha 1$, $\beta 1$, and $\gamma 1$ are each a value greater than zero. $\gamma 1$ may be, for example, 4, 6, or the like. In these cases, the stability of the battery is further improved. In addition, the ionic conductivity of the first solid electrolyte material is improved. X1 may be at least one selected from the group consisting of F, Cl, and Br. With any of these configurations, the stability of the battery is further improved. In addition, the ionic conductivity of the first solid electrolyte material is further improved. As a result, the charge-discharge efficiency of the battery is improved. Furthermore, in instances in which the first solid electrolyte material does not contain sulfur, generation of hydrogen sulfide gas can be inhibited.

On the other hand, the second solid electrolyte material may be a sulfide solid electrolyte material. In the present disclosure, the "sulfide solid electrolyte" is a solid electrolyte containing sulfur. Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, to any of these. LiX, $Li_2O$, $MO_q$, $Li_pMO_q$, and/or the like may be added. The element X is at least one selected from the group consisting of F, Cl, Br, and I, Furthermore, the element M is at least one selected from the group consisting of P, Si, Ge, B, Al, Ga, In, Fe, and Zn. Furthermore, p and q are each a natural number.

The second solid electrolyte material may be a material that contains Li, M2, and X2. The element M2 is at least one selected from the group consisting of metalloid elements and metal elements other than Li. Furthermore, the element X2 is at least one selected from the group consisting of F, Cl, Br, and I. With any of these configurations, the stability of the battery is further improved. In addition, the ionic conductivity of the second solid electrolyte material is further improved. As a result, the charge-discharge efficiency of the battery is improved. Furthermore, in instances in which the second solid electrolyte material does not contain sulfur, generation of hydrogen sulfide gas can be inhibited.

For example, the second solid electrolyte material may be a material represented by composition formula (1b): $Li_{\alpha 2}M2_{\beta 2}X2_{\gamma 2}$, where $\alpha 2$, $\beta 2$, and $\gamma 2$ are each a value greater than zero. $\gamma 2$ may be, for example, 4, 6, or the like. With any of these configurations, the stability of the battery is further improved. In addition, the ionic conductivity of the second solid electrolyte material is further improved.

In composition formula (1a), the element M1 may include Y (=yttrium). Furthermore, in composition formula (1b), the element M2 may include Y (=yttrium). That is, the first solid electrolyte material and/or the second solid electrolyte material may contain Y as a metal element.

A Y-containing first solid electrolyte material and a Y-containing second solid electrolyte material may be each independently a compound represented by, for example, a composition formula of $Li_aMe_bY_cX_6$, where a+mb+3c=6, and c>0 are satisfied. The element Me is at least one selected from the group consisting of metalloid elements and metal elements other than Li and Y. m represents the valence of the element Me. The element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, and Nb.

The first solid electrolyte material and the second solid electrolyte material may be each independently any of the following materials, for example. With any of the configurations described below, the ionic conductivity of the first solid electrolyte material and/or the second solid electrolyte material is further improved. As a result, output characteristics of the battery are further improved.

The first solid electrolyte material and/or the second solid electrolyte material may be a material represented by composition formula (A1):

$$Li_{6-3d}Y_dX_6$$

where the element X is at least one selected from the group consisting of Cl, Br, and I, and further, 0<d<2 is satisfied.

The first solid electrolyte material and/or the second solid electrolyte material may be a material represented by composition formula (A2):

$$Li_3YX_6$$

where the element X is at least one selected from the group consisting of Cl, Br, and I.

The first solid electrolyte material and/or the second solid electrolyte material may be a material represented by composition formula (A3):

$$Li_{3-3\delta}Y_{1+\delta}Cl_6$$

where 0<δ≤0.15 is satisfied.

The first solid electrolyte material and/or the second solid electrolyte material may be a material represented by composition formula (A4):

$$Li_{3-3\delta}Y_{1+\delta}Br_6$$

where 0<δ≤0.25 is satisfied.

The first solid electrolyte material and/or the second solid electrolyte material may be a material represented by composition formula (A5):

$$Li_{3-3\delta+a}Y_{1+\delta-a}Me_aCl_{6-x-y}Br_xI_y$$

where the element Me is at least one selected from the group consisting of Mg, Ca, Sr, Ba, and Zn.

In composition formula (A5), $-1<\delta<2$, $0<a<3$, $0<(3-3\delta+a)$, $0<(1+\delta-a)$, $0 \leq x \leq 6$, $0 \leq y \leq 6$, and $(x+y) \leq 6$ are satisfied.

The first solid electrolyte material and/or the second solid electrolyte material may be a material represented by composition formula (A6):

$$Li_{3-3\delta}Y_{1+\delta-a}Me_aCl_{6-x-y}Br_xI_y$$

where the element Me is at least one selected from the group consisting of Al, Sc, Ga, and In composition formula (A6), $-1<\delta<1$, $0<a<2$, $0<(1+\delta-a)$, $0 \leq x \leq 6$, $0 \leq y \leq 6$, and $(x+y) \leq 6$ are satisfied.

The first solid electrolyte material and/or the second solid electrolyte material may be a material represented by composition formula (A7):

$$Li_{3-3\delta-a}Y_{1+\delta-a}Me_eCl_{6-x-y}Br_xI_y$$

where the element Me is at least one selected from the group consisting of Zr, Hf, and Ti.

In composition formula (A7), $-1<\delta<1$, $0<a<1.5$, $0<(3-3\delta-a)$, $0<(1+\delta-a)$, $0 \leq x \leq 6$, $0 \leq y \leq 6$, and $(x+y) \leq 6$ are satisfied.

The first solid electrolyte material and/or the second solid electrolyte material may be a material represented by composition formula (A8):

$$Li_{3-3\delta-2a}Y_{1+\delta-a}Me_aCl_{6-x-y}Br_xI_y$$

where the element Me is at least one selected from the group consisting of Ta and Nb.

In composition formula (A8), $-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$ are satisfied.

More specifically, examples of the first solid electrolyte material and/or the second solid electrolyte material include $Li_3YX_6$, $Li_2MgX_4$, $Li_2FeX_4$, $Li(Al, Ga, In)X_4$, and $Li_3(Al, Ga, In)X_6$. The element X is at least one selected from the group consisting of Cl, Br, and I. Note that in the present disclosure, regarding the elements in formulae, expressions such as "(Al, Ga, In)" mean at least one element selected from the group of the elements in the parenthesis. That is, "(Al, Ga, In)" has the same meaning as "at least one selected from the group consisting of Al, Ga, and In". The same applies to other elements.

Even more specifically, examples of the first solid electrolyte material and/or the second solid electrolyte material include $Li_3YF_6$, $Li_3YCl_6$, $Li_3YBr_6$, $Li_3YI_6$, $Li_3YBrCl_5$, $Li_3YBr_3Cl_3$, $Li_3YBr_5Cl$, $Li_3YBr_5I$, $Li_3YBr_3I_3$, $Li_3YBrI_5$, $Li_3YClI_5$, $Li_3YCl_3I_3$, $Li_3YCl_5I$, $Li_3YBr_2Cl_2I_2$, $Li_3YBrCl_4I$, $Li_{2.7}Y_{1.1}Cl_6$, $Li_{2.5}Y_{0.5}Zr_{0.5}Cl_6$, and $Li_{2.5}Y_{0.3}Zr_{0.7}Cl_6$. With any of these configurations, the stability of the battery is easily improved. In addition, the ionic conductivity of the first and second solid electrolyte materials is easily improved, and the charge-discharge characteristics of the battery is easily improved.

For example, the first electrolyte layer 102 may include the first solid electrolyte material as a major component. That is, a mass percentage of the first solid electrolyte material in the entirety of the first electrolyte layer 102 may be, for example, greater than or equal to 50 mass %, or, greater than or equal to 70 mass %. For example, the first solid electrolyte material may constitute 100 mass % of the first electrolyte layer 102, excluding incidental impurities that are unintentionally incorporated. With any of these configurations, the stability and charge-discharge characteristics of the battery are further improved. That is, the first electrolyte layer 102 may be formed of substantially only the first solid electrolyte material. Note that the first electrolyte layer 102 may include a solid electrolyte material other than that described above.

The first electrolyte layer 102 includes the first solid electrolyte material as a major component, and in addition, the first electrolyte layer 102 may include incidental impurities, or, a portion of the starting materials used for the synthesis of the first solid electrolyte material, a by-product from the synthesis, and/or a decomposition product from the synthesis.

For example, the second electrolyte layer 103 may include the second solid electrolyte material as a major component. That is; a mass percentage of the second solid electrolyte material in the entirety of the second electrolyte layer 103 may be, for example, greater than or equal to 50 mass %, or, greater than or equal to 70 mass %. With any of these configurations, the charge-discharge characteristics of the battery are further improved. For example, the second solid electrolyte material may constitute 100 mass % of the second electrolyte layer 103, excluding incidental impurities that are unintentionally incorporated. That is, the second electrolyte layer 103 may be formed of substantially only the second solid electrolyte material. Note that the second electrolyte layer 103 may include a solid electrolyte material other than that described above.

The second electrolyte layer 103 includes the second solid electrolyte material as a major component, and in addition, the second electrolyte layer 103 may include incidental impurities, or, a portion of the starting materials used for the synthesis of the first solid electrolyte material, a by-product from the synthesis, and/or a decomposition product from the synthesis.

At least one of the positive electrode 101 and the negative electrode 104 may include an electrolyte material, which may be, for example, a solid electrolyte material. The solid electrolyte material that may be included in the electrodes and the electrolyte layers may be, for example, any of the following: a sulfide solid electrolyte, an oxide solid electrolyte, a halide solid electrolyte, a polymer solid electrolyte, and a complex hydride solid electrolyte. The solid electrolyte material may be, for example, the first solid electrolyte material and/or the second solid electrolyte material.

In the present disclosure, the "oxide solid electrolyte" is a solid electrolyte containing oxygen. The oxide solid electrolyte may contain additional anions, in addition to oxygen anions. The additional anions may be anions other than those of sulfur or those of halogen elements. In the present disclosure, the "halide solid electrolyte" is a solid electrolyte containing a halogen element and not containing sulfur. The halide solid electrolyte may be a compound containing Li, M3, O (oxygen), and $X_3$. The element M3 includes, for example, at least one selected from the group consisting of Nb and Ta. Furthermore, the element $X_3$ is at least one selected from the group consisting of Cl, Br, and I.

The compound containing Li, M3, X3, and O (oxygen) may be, for example, a material represented by composition formula (A9): $Li_xM3_yO_yX3_{5+x-2y}$, where x may satisfy $0.1<x<7.0$, and y may satisfy $0.4<y<1.9$.

The sulfide solid electrolyte may be any of the sulfide solid electrolytes mentioned above as examples of the second solid electrolyte material The oxide solid electrolyte may be, for example, any of the following: NASICON-type solid electrolytes typified by $LiTi_2(PO_4)_3$ and element-substituted derivatives thereof;

(LaLi)TiO$_3$-system perovskite-type solid electrolytes; LISICON-type solid electrolytes typified by Li$_{14}$ZnGe$_4$O$_{16}$, Li$_4$SiO$_4$, LiGeO$_4$, and element-substituted derivatives thereof; garnet-type solid electrolytes typified by Li$_7$La$_3$Zr$_2$O$_{12}$ and element-substituted derivatives thereof; Li$_3$PO$_4$ and N-substituted derivatives thereof; glass that is based on a Li—B—O compound such as LiBO$_2$ or Li$_3$BO$_3$ and which contains Li$_2$SO$_4$, Li$_2$CO$_3$, or the like added thereto; and glass-ceramics.

The halide solid electrolyte may be any of the compounds represented by composition formula (1a) or (1b), which are mentioned above as examples of the first or second solid electrolyte material.

The polymer solid electrolyte may be, for example, a compound of a polymeric compound and a lithium salt. The polymeric compound may have an ethylene oxide structure. Polymeric compounds having an ethylene oxide structure can contain large amounts of a lithium salt. Accordingly, ionic conductivity is further enhanced. Examples of the lithium salt include LiPF$_6$, LiBF$_4$, LiSbF$_6$, LiAsF$_6$, LiSO$_3$CF$_3$, LiN(SO$_2$F)$_2$, LiN(SO$_2$CF$_3$)$_2$, LiN(SO$_2$C$_2$F$_5$)$_2$, LiN(SO$_2$CF$_3$)(SO$_2$C$_4$F$_9$), and LiC(SO$_2$CF$_3$)$_3$. One lithium salt may be used alone, or two or more lithium salts may be used in combination.

The complex hydride solid electrolyte may be, for example, LiBH$_4$—LiI, LiBH$_4$—P$_2$S$_5$, or the like.

There are no limitations on a shape of the first and second solid electrolyte materials. Examples of the shape of the solid electrolyte materials include acicular shapes, spherical shapes, and ellipsoidal shapes. The shape of the first and second solid electrolyte materials may be, for example, a particulate shape.

The first electrolyte layer 102 and the second electrolyte layer 103 may each have a thickness of greater than or equal to 1 μm and less than or equal to 300 μm. When the thickness of each of the layers is greater than or equal to 1 Vim, short-circuiting between the positive electrode 101 and the negative electrode 104 is unlikely to occur. When the thickness of each of the layers is less than or equal to 300 μm, a high-output operation of the battery is further facilitated.

The positive electrode 101 includes a positive electrode active material and an electrolyte material. The positive electrode active material includes a material that has a property of occluding and releasing metal ions (e.g., lithium ions). Examples of the positive electrode active material include lithium transition metal oxides, transition metal fluorides, polyanionic materials, fluorinated polyanionic materials, transition metal sulfides, transition metal oxysulfides, and transition metal oxynitrides. Examples of the lithium transition metal oxides include Li(Ni, Co, Al)O$_2$ and LiCoO$_2$. Using, for example, a lithium transition metal oxide as a positive electrode active material enables the cost of production to be reduced and an average discharge voltage to be increased. To increase an energy density of the battery, lithium nickel cobalt manganese oxide may be used as a positive electrode active material. For example, the positive electrode active material may be Li(Ni, Co, Mn)O$_2$.

When a solid electrolyte material included in the positive electrode 101 has a particulate shape (e.g., a spherical shape), the solid electrolyte material may have a median diameter of less than or equal to 100 μm. When the median diameter of the solid electrolyte material is less than or equal to 100 μm, the positive electrode active material and the solid electrolyte material can be favorably dispersed in the positive electrode 101. As a result, the charge-discharge characteristics of the battery are improved.

The median diameter of the solid electrolyte material included in the positive electrode 101 may be less than a median diameter of the positive electrode active material. In this case, the solid electrolyte material and the positive electrode active material can be favorably dispersed.

The median diameter of the positive electrode active material may be greater than or equal to 0.1 μm and less than or equal to 100 μm. When the median diameter of the positive electrode active material is greater than or equal to 0.1 μm, the positive electrode active material and the solid electrolyte material can be favorably dispersed in the positive electrode 101. As a result, the charge-discharge characteristics of the battery are improved. When the median diameter of the positive electrode active material is less than or equal to 100 μm, a lithium diffusion rate in the positive electrode active material is improved. As a result, the battery can operate with a high output.

The "median diameter" is a particle diameter corresponding to a cumulative volume of 50% in a volume-based particle size distribution. The volume-based particle size distribution can be measured, for example, by using an analyzer, such as a laser diffraction analyzer or an image analyzer. The same applies to the other materials described below.

When volume fractions of the positive electrode active material and the solid electrolyte material included in the positive electrode 101 are expressed as "v1:100−v1", 30≤v1≤95 may be satisfied. Here, v1 represents the volume fraction of the positive electrode active material provided that a total volume of the positive electrode active material and the solid electrolyte material included in the positive electrode 101 is taken as 100. When 30≤v1 is satisfied, a sufficient energy density of the battery can be easily ensured. When v1≤95 is satisfied, a high-output operation of the battery is further facilitated.

The positive electrode 101 may have a thickness of greater than or equal to 10 μm and less than or equal to 500 μm. When the thickness of the positive electrode is greater than or equal to 10 μm, a sufficient energy density of the battery is easily ensured. When the thickness of the positive electrode is less than or equal to 500 μM, a high-output operation of the battery is further facilitated.

The negative electrode 104 includes, as a negative electrode active material, for example, a material that has a property of occluding and releasing metal ions (e.g., lithium ions). Examples of the negative electrode active material include metal materials, carbon materials, oxides, nitrides, tin compounds, and silicon compounds. The metal materials may be elemental metals or alloys. Examples of the metal materials include lithium metals and lithium alloys. Examples of the carbon materials include natural graphite, coke, partially-graphitized carbon, carbon fibers, spherical carbon, artificial graphite, and amorphous carbon. Using silicon (Si), tin (Sn), a silicon compound, a tin compound, or the like enables a capacity density to be improved.

The negative electrode active material may have a median diameter of greater than or equal to 0.1 μm and less than or equal to 100 μm. When the median diameter of the negative electrode active material is greater than or equal to 0.1 μm, the negative electrode active material and a solid electrolyte material can be favorably dispersed in the negative electrode 104. As a result, the charge-discharge characteristics of the battery are improved. When the median diameter of the negative electrode active material is less than or equal to 100 μm, a lithium diffusion rate in the negative electrode active material is improved. As a result, the battery can operate with a high output.

The median diameter of the negative electrode active material may be greater than a median diameter of the solid electrolyte material. In this case, the solid electrolyte material and the negative electrode active material can be favorably dispersed.

When volume fractions of the negative electrode active material and the solid electrolyte material included in the negative electrode 104 are expressed as "v2:100−v2", 30≤v2≤95 may be satisfied. Here, v2 represents the volume fraction of the negative electrode active material provided that a total volume of the negative electrode active material and the solid electrolyte material included in the negative electrode 104 is taken as 100. When 30≤v2 is satisfied, a sufficient energy density of the battery can be easily ensured. When v2≤95 is satisfied, a high-output operation of the battery is further facilitated.

The negative electrode 104 may have a thickness of greater than or equal to 10 μm and less than or equal to 500 μm. When the thickness of the negative electrode is greater than or equal to 10 μm, a sufficient energy density of the battery is easily ensured. When the thickness of the negative electrode is less than or equal to 500 pin, a high-output operation of the battery is further facilitated.

The positive electrode active material and the negative electrode active material may be coated with a coating material so as to reduce interfacial resistance between each of the active materials and the solid electrolyte material. The coating material may be a material having low electron conductivity. The coating material may be an oxide material, an oxide solid electrolyte, or the like.

Examples of the oxide material include $SiO_2$, $Al_2O_3$, $TiO_2$, $B_2O_3$, $Nb_2O_5$, $WO_3$, and $ZrO_2$.

Examples of the oxide solid electrolyte include Li—Nb—O compounds, such as $LiNbO_3$; Li—B—O compounds, such as $LiBO_2$ and $Li_3BO_3$; Li—Al—O compounds, such as $LiAlO_2$; Li—Si—O compounds, such as $Li_4SiO_4$; $Li_2SO_4$; Li—Ti—O compounds, such as $Li_4Ti_5O_{12}$; Li—Zr—O compounds, such as $Li_2ZrO_3$; Li—Mo—O compounds, such as $Li_2MoO_3$; Li—V—O compounds, such as $LiV_2O_5$; and Li—W—O compounds, such as $Li_2WO_4$, Oxide solid electrolytes have high ionic conductivity and high high-potential stability. Accordingly, using an oxide solid electrolyte enables the charge-discharge efficiency of the battery to be further improved.

A non-aqueous electrolyte solution, a gel electrolyte, or an ionic liquid may be included in at least one selected from the group consisting of the positive electrode 101, the first electrolyte layer 102, the second electrolyte layer 103, and the negative electrode 104, to facilitate the transfer of lithium ions, thereby improving the output characteristics of the battery.

The non-aqueous electrolyte solution includes a non-aqueous solvent and a lithium salt dissolved in the non-aqueous solvent. Examples of the non-aqueous solvent include cyclic carbonate solvents, chain carbonate solvents, cyclic ether solvents, chain ether solvents, cyclic ester solvents, chain ester solvents, and fluorinated solvents. Examples of the cyclic carbonate solvents include ethylene carbonate, propylene carbonate, and butylene carbonate. Examples of the chain carbonate solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. One of these may be used alone, or two or more of these may be used in combination, The non-aqueous electrolyte solution may include at least one fluorinated solvent selected from the group consisting of fluoroethylene carbonate, fluoromethyl propionate, fluorobenzene, fluoroethyl methyl carbonate, and fluorodimethylene carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. One of these may be used alone, or two or more of these may be used in combination. A suitable concentration of the lithium salt is, for example, greater than or equal to 0.5 mol/liter and less than or equal to 2 mol/liter.

The gel electrolyte may be a material in which a non-aqueous electrolyte solution is contained in a polymeric material. Examples of the polymeric material include polyethylene oxide, polyacrylonitrile, polyvinylidene fluoride, polymethylmethacrylate, and polymers having an ethylene oxide linkage.

Examples of a cation that forms the ionic liquid include aliphatic chain quaternary cations, such as tetraalkylammonium and tetraalkylphosphonium; aliphatic cyclic ammonium cations, such as pyrrolidiniums, morpholiniums, imidazoliniums, tetrahydropyrimidiniums, piperaziniums, and piperidiniums; and nitrogen-containing heterocyclic aromatic cations, such as pyridiniums and imidazoliums. Examples of an anion that forms the ionic liquid include $PF_6^-$, $BF_4^-$, $SbF_6^-$, $AsF_6^-$, $SO_3CF_3^-$, $N(SO_2F)_2^-$, $N(SO_2CF_3)_2^-$, $N(SO_2C_2F_5)_2^-$", $N(SO_2CF_3)(SO_2C_4F_9)^-$, and $C(SO_2CF_3)_3^-$. The ionic liquid may contain a lithium salt.

A binding agent may be included in at least one selected from the group consisting of the positive electrode 101, the first electrolyte layer 102, the second electrolyte layer 103, and the negative electrode 104, to improve adhesion between particles. The binding agent is used to improve the binding properties of the materials that form the electrodes and/or the electrolyte layers. Examples of the binding agent include polyvinylidene fluoride, polytetrafluoroethylene, polyethylene, polypropylene, aramid resins, polyamides, polyimides, polyamide-imides, polyacrylonitrile, polyacrylic acids, poly(methyl acrylate), poly(ethyl acrylate), poly(hexyl acrylate); polymethacrylic acids, poly(methyl methacrylate), poly(ethyl methacrylate), poly(hexyl methacrylate), polyvinyl acetate, polyvinylpyrrolidone, polyethers, polyether sulfones, hexafluoropolypropylene; styrene butadiene rubber, and carboxymethyl cellulose. The binding agent may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acids, and hexadiene. One of these may be used alone, or two or more of these may be used in combination.

At least one of the positive electrode 101 and the negative electrode 104 may include a conductive additive to enable electron conductivity to be enhanced. Examples of the conductive additive include graphites, such as natural graphite and artificial graphite; carbon blacks, such as acetylene black and Ketjen black; conductive fibers, such as carbon fiber and metal fiber; conductive powders, such as those of carbon fluoride and those of aluminum; conductive whiskers, such as those of zinc oxide and those of potassium titanate; conductive metal oxides, such as titanium oxide;

and conductive polymers, such as polyaniline, polypyrrole, and polythiophene. Using a carbon material as a conductive additive enables a cost reduction to be achieved.

Examples of a shape of the battery include coin shapes; cylindrical shapes, prismatic shapes, sheet shapes, button shapes, flat shapes, and stack shapes.

Method for Producing Solid Electrolyte Material

An example of a method for producing the first solid electrolyte material, which is represented by composition formula (1a), will be described below.

First, several types of raw material powders of binary halides are prepared in accordance with the target composition. The "binary halide" is a compound formed of two elements including a halogen element. For example, when $Li_3YCl_6$ is to be produced, a raw material powder of LiCl and a raw material powder of $YCl_3$ are prepared in a molar ratio of 3:1. In this instance, the elemental species of $M_1$ and $X_1$ of composition formula (1a) can be determined by the selection of the types of the raw material powders. Furthermore, the values of $\alpha 1$, $\beta 1$, and $\gamma 1$ of composition formula (1a) can be adjusted by adjusting the types of the raw material powders, the compounding ratio between the raw material powders, and the synthesis process.

After the raw material powders are mixed together and ground, the raw material powders are caused to react with each other by using a mechanochemical milling method. Alternatively, after the raw material powders are mixed together and ground, the raw material powders may be sintered in a vacuum or in an inert atmosphere. The sintering may be carried out under sintering conditions including a range of 100° C. to 400° C. and a duration of one hour or more, for example. By using any of these methods, the solid electrolyte material can be obtained.

Note that the form of the crystalline phase (i.e., the crystal structure) of the solid electrolyte material can be adjusted or determined by the method by which the raw material powders are reacted together and the reaction conditions.

Second Embodiment

Figure 2:
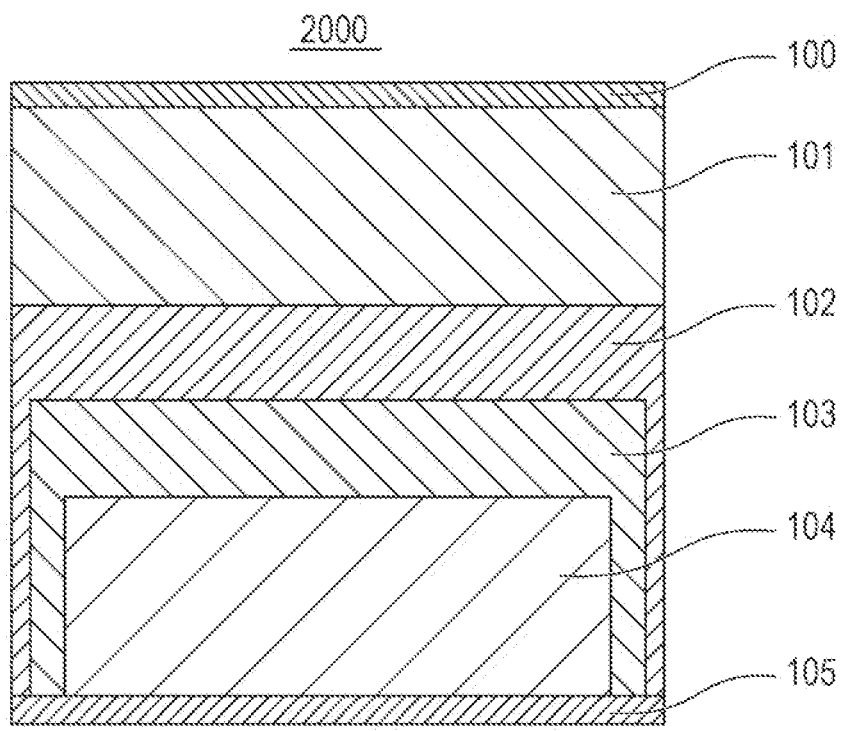
FIG. 2 is a cross-sectional view illustrating a general configuration of a battery according to a second embodiment.

A second embodiment of the present disclosure will be described below. Descriptions that are the same as those in the first embodiment will be omitted where appropriate. FIG. 2 is a cross-sectional view illustrating a general configuration of a battery 2000, according to the second embodiment. The battery 2000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to be in contact with the second electrolyte layer 103 and cover the second electrolyte layer 103. The first electrolyte layer 102 is also in contact with the negative electrode current collector 105.

Furthermore, the second electrolyte layer 103 is disposed to be in contact with the negative electrode 104 and cover the negative electrode 104. The second electrolyte layer 103 is also in contact with the negative electrode current collector 105.

In this manner, the first electrolyte layer 102, which is electrochemically stable, is disposed between the second electrolyte layer 103 and the positive electrode 101, and as a result, the positive electrode 101 or the positive electrode current collector 100 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

Note that the materials (e.g., the solid electrolyte materials) used in the second embodiment may be ones appropriately selected from the materials mentioned in the first embodiment.

Third Embodiment

Figure 3:
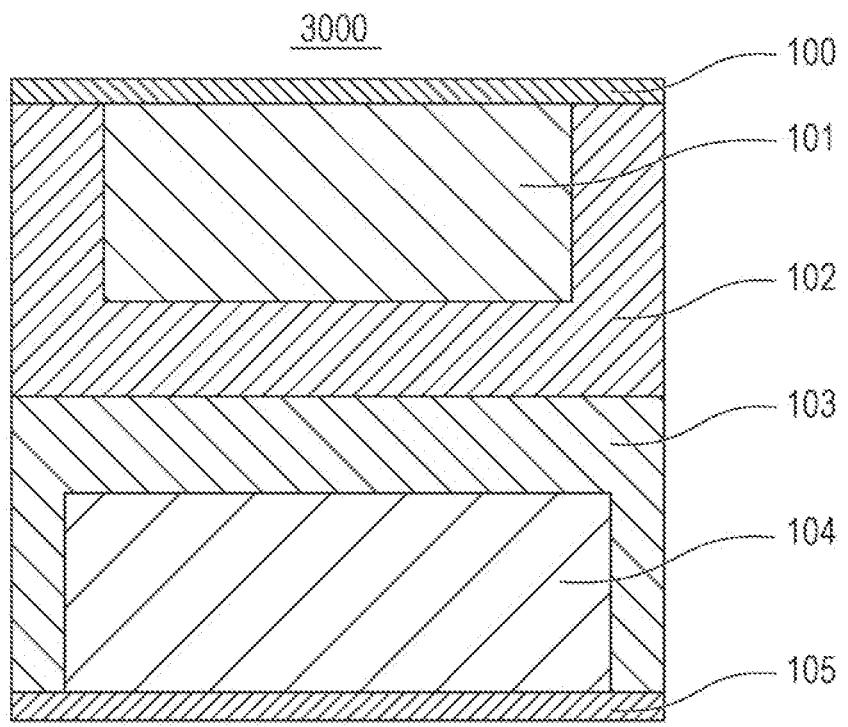
FIG. 3 is a cross-sectional view illustrating a general configuration of a battery according to a third embodiment.

A third embodiment of the present disclosure will be described below. Descriptions that are the same as those in the first embodiment will be omitted where appropriate. FIG. 3 is a cross-sectional view illustrating a general configuration of a battery 3000, according to the third embodiment. The battery 3000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to be in contact with the positive electrode 101 and cover the positive electrode 101. The first electrolyte layer 102 is also in contact with the positive electrode current collector 100.

Furthermore, the second electrolyte layer 103 is disposed to be in contact with the negative electrode 104 and cover the negative electrode 104. The second electrolyte layer 103 is also in contact with the negative electrode current collector 105.

In this manner, the first electrolyte layer 102, which is electrochemically stable, is disposed between the second electrolyte layer 103 and the positive electrode 101, and as a result, the positive electrode 101 or the positive electrode current collector 100 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

In addition, with the configuration described above, the negative electrode 104 does not easily come into contact with the first electrolyte layer 102, and, therefore, for example, reductive decomposition of the first solid electrolyte material is also inhibited. Accordingly, even in instances in which a material having low reduction resistance is used as the first solid electrolyte material, the battery can be stably used.

Note that the materials (e.g.; the solid electrolyte materials) used in the third embodiment may be ones appropriately selected from the materials mentioned in the first embodiment.

Fourth Embodiment

Figure 4:
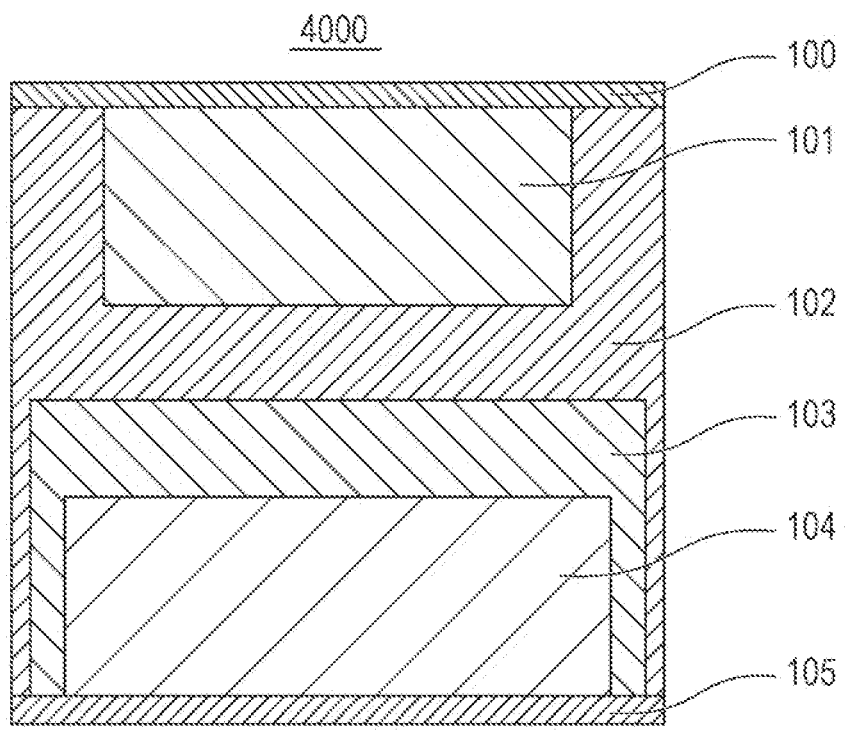
FIG. 4 is a cross-sectional view illustrating a general configuration of a battery according to a fourth embodiment.

A fourth embodiment of the present disclosure will be described below. Descriptions that are the same as those in the first embodiment will be omitted where appropriate. FIG. 4 is a cross-sectional view illustrating a general configuration of a battery 4000, according to the fourth embodiment. The battery 4000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to be in contact with the positive electrode 101 and cover the positive electrode 101. The first electrolyte layer 102 is also in contact with the positive electrode current collector 100.

Furthermore, the first electrolyte layer 102 is disposed to be in contact with the second electrolyte layer 103 and cover the second electrolyte layer 103. The first electrolyte layer 102 is also in contact with the negative electrode current collector 105.

Furthermore, the second electrolyte layer 103 is disposed to be in contact with the negative electrode 104 and cover the negative electrode 104. The second electrolyte layer 103 is also in contact with the negative electrode current collector 105.

In this manner, the first electrolyte layer 102, which is electrochemically stable, is disposed between the second electrolyte layer 103 and the positive electrode 101, and as a result, the positive electrode 101 or the positive electrode current collector 100 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

Note that the materials (e.g., the solid electrolyte materials) used in the fourth embodiment may be ones appropriately selected from the materials mentioned in the first embodiment.

Fifth Embodiment

Figure 5:
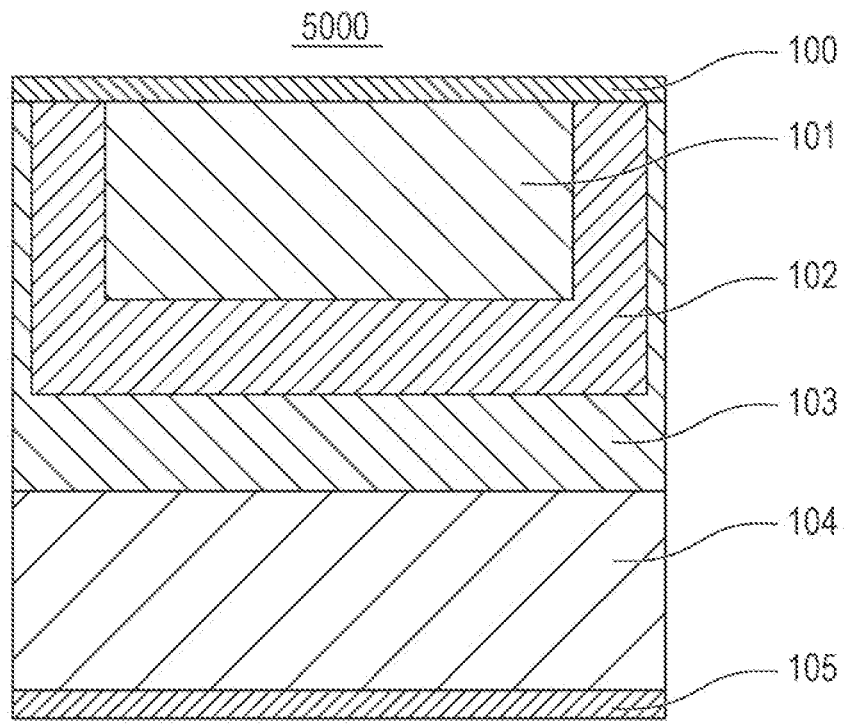
FIG. 5 is a cross-sectional view illustrating a general configuration of a battery according to a fifth embodiment.

A fifth embodiment of the present disclosure will be described below. Descriptions that are the same as those in the first embodiment will be omitted where appropriate. FIG. 5 is a cross-sectional view illustrating a general configuration of a battery 5000, according to the fifth embodiment. The battery 5000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to be in contact with the positive electrode 101 and cover the positive electrode 101. The first electrolyte layer 102 is also in contact with the positive electrode current collector 100.

Furthermore, the second electrolyte layer 103 is disposed to be in contact with the first electrolyte layer 102 and cover the first electrolyte layer 102. The second electrolyte layer 103 is also in contact with the positive electrode current collector 100.

In this manner, the first electrolyte layer 102, which is electrochemically stable, is disposed between the second electrolyte layer 103 and the positive electrode 101, and as a result, the positive electrode 101 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

In addition, with the configuration described above, the negative electrode 104 does not easily come into contact with the first electrolyte layer 102, and, therefore, for example, reductive decomposition of the first solid electrolyte material is also inhibited. Accordingly, even in instances in which a material having low reduction resistance is used as the first solid electrolyte material, the battery can be stably used.

Note that the materials (e.g., the solid electrolyte materials) used in the fifth embodiment may be ones appropriately selected from the materials mentioned in the first embodiment.

Sixth Embodiment

Figure 6:
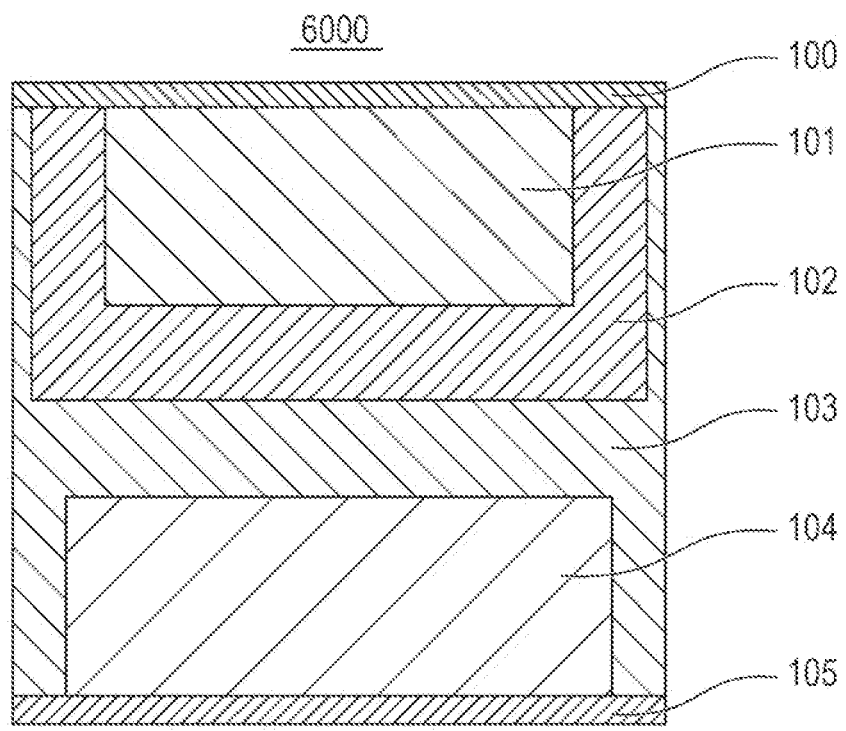
FIG. 6 is a cross-sectional view illustrating a general configuration of a battery according to a sixth embodiment.

A sixth embodiment of the present disclosure will be described below. Descriptions that are the same as those in the first embodiment will be omitted where appropriate. FIG. 6 is a cross-sectional view illustrating a general configuration of a battery 6000, according to the sixth embodiment. The battery 6000 includes a positive electrode current collector 100, a positive electrode 101, a first electrolyte layer 102, a second electrolyte layer 103, a negative electrode 104, and a negative electrode current collector 105, which are disposed in the order stated. The first electrolyte layer 102 includes a first solid electrolyte material, and the second electrolyte layer 103 includes a second solid electrolyte material. An oxidation potential of the first solid electrolyte material may be more noble than an oxidation potential of the second solid electrolyte material.

The first electrolyte layer 102 is disposed to be in contact with the positive electrode 101 and cover the positive electrode 101. The first electrolyte layer 102 is also in contact with the positive electrode current collector 100.

Furthermore, the second electrolyte layer 103 is disposed to be in contact with the negative electrode 104 and cover the negative electrode 104. The second electrolyte layer 103 is also in contact with the negative electrode current collector 105.

Furthermore, the second electrolyte layer 103 is disposed to be in contact with the first electrolyte layer 102 and cover the first electrolyte layer 102. The second electrolyte layer 103 is also in contact with the positive electrode current collector 100.

In this manner, the first electrolyte layer 102, which is electrochemically stable, is disposed between the second electrolyte layer 103 and the positive electrode 101, and as a result, the positive electrode 101 does not easily come into contact with the second electrolyte layer 103, and, therefore, oxidative decomposition of the second solid electrolyte material is inhibited to a high degree. Accordingly, even in instances in which a material having low oxidation resistance is used as the second solid electrolyte material, the battery can be stably used. In addition, with the configuration described above, short-circuiting of the battery is easily inhibited.

In addition, with the configuration described above, the negative electrode 104 does not easily come into contact with the first electrolyte layer 102, and, therefore, for example, reductive decomposition of the first solid electrolyte material is also inhibited. Accordingly, even in instances in which a material having low reduction resistance is used as the first solid electrolyte material, the battery can be stably used, Note that the materials (e.g., the solid electrolyte materials) used in the sixth embodiment may be ones appropriately selected from the materials mentioned in the first embodiment.

Batteries according to the present disclosure can be used as all-solid-state batteries, for example.

What is claimed is:

1. A battery comprising:
a positive electrode current collector;
a positive electrode;
a first electrolyte layer;
a second electrolyte layer;
a negative electrode; and
a negative electrode current collector, wherein
the positive electrode current collector, the positive electrode, the first electrolyte layer, the second electrolyte layer, the negative electrode, and the negative electrode current collector are disposed in this order and are stacked in a stacking direction,
the first electrolyte layer contains a first solid electrolyte material,
the second electrolyte layer contains a second solid electrolyte material, the second solid electrolyte material being different from the first solid electrolyte material,
an oxidation potential of the first solid electrolyte material is more noble than an oxidation potential of the second solid electrolyte material,
the first electrolyte layer is a single-layer structure,
the first electrolyte layer directly covers the positive electrode in the stacking direction and is in contact with the positive electrode current collector,
at least part of the first electrolyte layer is disposed between the positive electrode and the second electrolyte layer in the stacking direction, and
the first electrolyte layer covers the second electrolyte layer and is in direct contact with the negative electrode current collector.

2. The battery according to claim 1, wherein the first electrolyte layer is in contact with the positive electrode.

3. The battery according to claim 1, wherein the second electrolyte layer is in contact with the negative electrode and covers the negative electrode.

4. The battery according to claim 1, wherein the first electrolyte layer is in contact with the second electrolyte layer and covers the second electrolyte layer.

5. The battery according to claim 1, wherein the second electrolyte layer is in contact with the first electrolyte layer and covers the first electrolyte layer.

6. The battery according to claim 1, wherein the first solid electrolyte material contains Li, M, and X,
where M is at least one selected from the group consisting of metalloid elements and metal elements other than Li, and X is at least one selected from the group consisting of F, Cl, Br, and I.

7. The battery according to claim 6, wherein the first solid electrolyte material is represented by a composition formula of $Li_\alpha M_\beta X_\gamma$,
where $\alpha$, $\beta$, and $\gamma$ are each a value greater than zero.

8. The battery according to claim 6, wherein M includes yttrium.

9. The battery according to claim 1, wherein the second solid electrolyte material is a sulfide solid electrolyte.

10. The battery according to claim 1, wherein the first electrolyte layer partially includes a solid electrolyte material that is the same as one in the second electrolyte layer.

11. The battery according to claim 10, wherein the solid electrolyte material that is included in the second electrolyte layer and also included in the first electrolyte layer is present in an amount of less than or equal to 30% relative to an amount of the second electrolyte layer in terms of a volume fraction.

12. The battery according to claim 1, wherein the first electrolyte layer completely covers the positive electrode seen from the stacking direction.

13. The battery according to claim 1, wherein the first electrolyte layer as a whole is an integrated one piece.

14. The battery according to claim 1, wherein the first electrolyte layer consists of a single solid electrolyte material.

* * * * *